United States Patent
Noguchi

(10) Patent No.: US 10,288,168 B2
(45) Date of Patent: May 14, 2019

(54) TRANSMISSION CONTROL DEVICE FOR AUTOMATIC TRANSMISSION

(71) Applicant: HONDA MOTOR CO., LTD., Tokyo (JP)

(72) Inventor: Tomoyuki Noguchi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 168 days.

(21) Appl. No.: 15/546,513

(22) PCT Filed: Feb. 8, 2016

(86) PCT No.: PCT/JP2016/053708
§ 371 (c)(1),
(2) Date: Jul. 26, 2017

(87) PCT Pub. No.: WO2016/129564
PCT Pub. Date: Aug. 18, 2016

(65) Prior Publication Data
US 2018/0023693 A1 Jan. 25, 2018

(30) Foreign Application Priority Data
Feb. 12, 2015 (JP) ................. 2015-025097

(51) Int. Cl.
*F16H 61/02* (2006.01)
*F16H 59/66* (2006.01)
(Continued)

(52) U.S. Cl.
CPC ......... *F16H 61/0213* (2013.01); *F16H 59/18* (2013.01); *F16H 59/22* (2013.01);
(Continued)

(58) Field of Classification Search
CPC ....... B60W 2550/143; B60W 2550/146; F16H 61/0213; F16H 59/66; F16H 2059/666; F16H 2061/0237
See application file for complete search history.

(56) References Cited

U.S. PATENT DOCUMENTS 6,085,137 A * 7/2000 Aruga ............... F16H 59/66
477/120
8,075,445 B2 * 12/2011 Shiiba ............... F16H 59/66
477/97
8,670,907 B2 * 3/2014 Kondou ............ B60W 10/06
180/271

FOREIGN PATENT DOCUMENTS

JP   8-194895   7/1996
JP   9-240321   9/1997
(Continued)

OTHER PUBLICATIONS

International Search Report, dated Apr. 19, 2016 (dated Apr. 19, 2016), 2 pages.

*Primary Examiner* — Tisha D Lewis
(74) *Attorney, Agent, or Firm* — Rankin, Hill & Clark LLP

(57) ABSTRACT

A corner determinator detects a corner appearing in a traveling direction of a vehicle and determines whether a detected corner is a blind corner based upon a current position of the vehicle and road data. A blind distance calculator calculates a distance from the determined blind corner to the vehicle based upon the current position of the vehicle and the road data. A necessary engine braking amount calculator calculates, on the basis of a calculated distance, a necessary engine braking amount necessary for decelerating a current vehicle speed to a vehicle speed at which it is possible to stop around the blind corner when a braking operation is performed with a full braking amount.

(Continued)

A required speed change stage determinator calculates a required speed change stage based upon the determined necessary engine braking amount. A transmission controller performs a downshift to a determined required speed change stage.

15 Claims, 6 Drawing Sheets

(51) Int. Cl.
     *F16H 59/18*     (2006.01)
     *F16H 59/22*     (2006.01)

(52) U.S. Cl.
     CPC .... *F16H 59/66* (2013.01); *B60Y 2300/18133* (2013.01); *F16H 2059/666* (2013.01); *F16H 2061/0237* (2013.01)

(56) References Cited

FOREIGN PATENT DOCUMENTS

| | | |
|---|---|---|
| JP | 2000-283286 | 10/2000 |
| JP | 2008-002636 | 1/2008 |
| JP | 2010-105454 | 5/2010 |
| JP | 2010-249191 | 11/2010 |

\* cited by examiner

TRANSMISSION CONTROL DEVICE FOR AUTOMATIC TRANSMISSION

TECHNICAL FIELD

The present invention relates to a transmission control device for an automatic transmission and, more specifically, to downshift control in front of a blind corner.

BACKGROUND ART

In general, a driver of a vehicle may perform a downshift operation in front of a corner for the purpose of, for example, deceleration of the vehicle, stabilization of the vehicle behavior, or immediate generation of driving force at a rising of the corner. By performing the downshift operation in front of the corner, an engine braking is effectively usable to achieve the deceleration of the vehicle, the stabilization of the vehicle behavior, or the like.

When the downshift operation is performed by a manual operation in an automatic transmission, the driver performs the downshift by selecting a speed change stage one by one through, for example, a shift lever operation in a manual range, or an operation of a paddle switch disposed on a steering wheel. However, multi-staging of recent automatic transmissions is remarkable, and it is therefore necessary to perform the downshift operation several times until obtaining an intended engine braking amount. This can be time consuming. For example, during traveling at a high speed stage, such as on high speed traveling, the high speed stage has a high ratio and there is a small ratio difference between a plurality of speed change stages. Hence, it particularly takes time to achieve the downshift from the high speed stage to an intended speed change stage.

Meanwhile, as one of automatic downshift control in a conventionally known automatic transmission, for example, the following Patent document 1 discloses detecting a corner ahead of a vehicle and determining a speed change stage that becomes a target of downshift, taking the corner ahead into consideration. However, downshift control that fits characteristics of the corner is insufficient only by detecting the corner and performing downshift control accordingly as in the case with this conventional technology. In particular, a blind corner where an end of the corner is not visible needs more attention during traveling, for example, because it is necessary to consider a situation where an obstacle, such as a vehicle and a falling object, may suddenly appears at the end of the blind corner. This necessitates a larger deceleration than the case of passing through a highly-visible corner, and there remains a desire for downshift control that fits the characteristics of the corner.

For example, Patent document 2 discloses as follows. When a vehicle enters a corner, a determination is made as to whether the corner is a blind corner where the front is not visible from a viewpoint of a driver. In the case of the blind corner, it is configured to generate an alarm or control a traveling state of the vehicle. However, Patent document 2 merely describes determining a downshift amount according to a vehicle speed as one of control of the traveling state of the vehicle at the blind corner (refer to paragraph [0214] etc. in Patent document 2). This disclosure does not also consider performing the downshift control that fits the characteristics of the blind corner.

RELATED ART DOCUMENTS

Patent Documents

[Patent document 1]
  Japanese Unexamined Patent Application Publication No. 2000-283286

[Patent document 2]
  Japanese Unexamined Patent Application Publication No. Hei 8-194895

SUMMARY OF THE INVENTION

The present invention has been made in view of the foregoing points, and aims at providing a transmission control device for an automatic transmission which is configured to automatically perform, in front of a blind corner, appropriate downshift control that fits characteristics of the blind corner.

A transmission control device (10) for an automatic transmission (100) of the present invention according to claim 1 includes: detection means (22) for detecting a current position of a vehicle; storage means (24) for storing road data; corner determination means (12) for detecting a corner appearing in a traveling direction of the vehicle and determining whether a detected corner is a blind corner where an end of the corner is not visible from the vehicle, on the basis of the detected current position and the road data being stored; blind distance calculation means (13) for calculating, when a determination is made that the corner is a blind corner, a distance from the determined blind corner to the vehicle on the basis of the detected current position and the stored road data; a necessary engine braking amount calculation means (14) for calculating, on the basis of the calculated distance, a necessary engine braking amount necessary for decelerating a current vehicle speed to a vehicle speed at which it is possible to stop around the blind corner when a braking operation is performed with a full braking amount; required speed change stage determination means (15) for determining a required speed change stage on the basis of the calculated necessary engine braking amount; and transmission control means (16) for performing control so as to achieve a downshift to the determined required speed change stage.

When a vehicle enters a blind corner, a distance between the blind corner to the vehicle is calculated in front of the blind corner. A necessary engine braking amount is calculated on the basis of a calculated distance. A required speed change stage is determined on the basis of a calculated necessary engine braking amount. Because the necessary engine braking amount corresponds to an engine braking amount necessary for decelerating a current vehicle speed to a vehicle speed at which it is possible to stop around the blind corner when a braking operation is performed with a full braking amount, the necessary engine braking amount corresponds to an appropriate engine braking amount that fits characteristics of the blind corner. It is therefore possible to automatically perform downshift control to achieve an appropriate required speed change stage that fits the characteristics of the blind corner. This makes it possible to apply engine braking with an optimum engine braking amount that fits the characteristics of the blind corner. It is therefore possible to, for example, automatically sufficiently decelerate the vehicle in front of the blind corner, stabilize the vehicle behavior, and obtain a driving force at a rising of the corner. It is also possible to automatically achieve the driver's intention of applying appropriate engine braking in front of the blind corner. In particular, with the multi-staged automatic transmission, it takes much time to obtain an intended engine braking amount by a manual downshift operation on a one stage basis. With the present invention, the driver's intention is achievable in less time.

The above drawing reference numerals put in brackets are ones which illustrate corresponding components or the like in embodiments described later, for the purpose of reference.

The present invention is configured to calculate, in front of a blind corner, a necessary engine braking amount that fits characteristics of the blind corner, determine a required speed change stage on the basis of the necessary engine braking amount, and automatically perform a downshift to the determined required speed change stage. This produces the following excellent effects that it is possible to apply engine braking with an optimum engine braking amount that fits the characteristics of the blind corner, and that it is possible to automatically achieve a driver's intention of applying appropriate engine braking in front of the blind corner. The driver is therefore capable of traveling with a sense of ease even for a visually obstructed blind corner.

MODE FOR CARRYING OUT THE INVENTION

An embodiment of the present invention is described in detail below with reference to the accompanying drawings.

Figure 1:
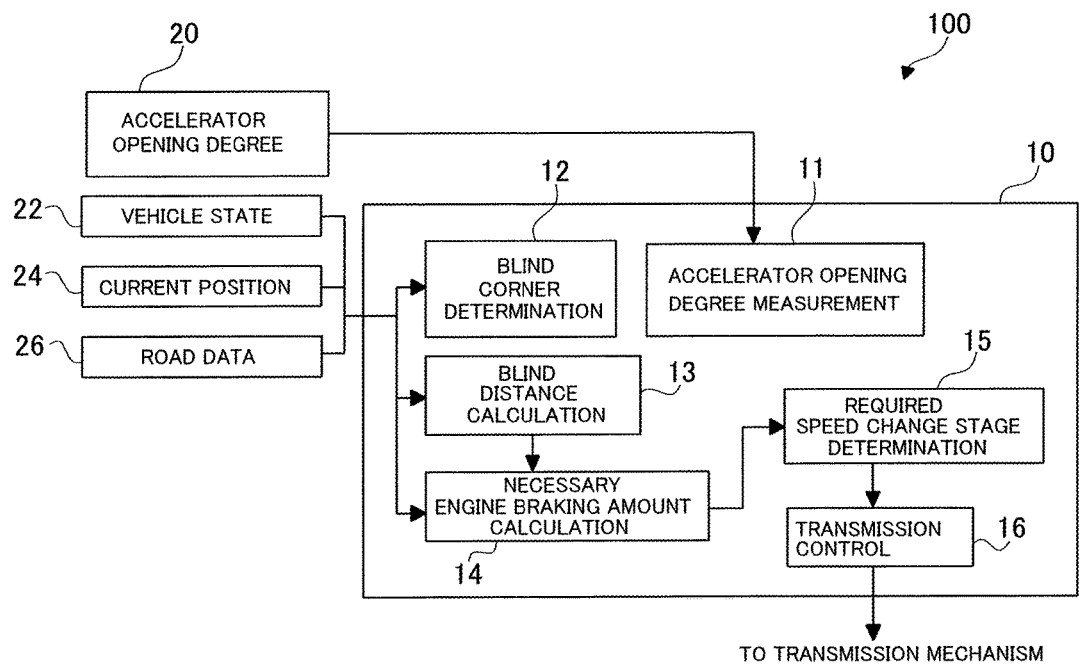
FIG. 1 is a functional block diagram that shows a configuration of a transmission control device for an automatic transmission according to an embodiment of the present invention.

FIG. 1 is a functional block diagram that shows a configuration of a transmission control device for an automatic transmission according to an embodiment of the present invention. The automatic transmission 100 is intended to transmit output of an engine (not shown) to driving wheels (not shown), and includes a transmission mechanism made up of a torque converter (not shown) and a multistage transmission gear mechanism (not shown). The automatic transmission 100 also includes a transmission control device 10 for controlling a speed change operation of the transmission mechanism (hereinafter also referred to as "transmission control"), and is configured to select one of a plurality of speed change stages by the transmission control of the transmission control device 10.

The transmission control device 10 is made up of a CPU, memory, an A/D converter, a D/A converter, and a microcomputer with an interface that acquires various kinds of information containing detection signals of various kinds of sensors and input signals through various kinds of user operations. The transmission control is performed by the CPU (processor unit) executing a software program stored in a memory (non-transitory computer readable storage medium).

An accelerator opening degree sensor 20, a vehicle state detection sensor 22, a current position detection sensor 24, and a road data storage means 26 are coupled to the transmission control device 10. The accelerator opening degree sensor 20 detects an accelerator opening degree of an engine corresponding to an accelerator pedal operation by a driver, and then outputs a detection signal to the transmission control device 10. The vehicle state detection sensor 22 is intended to detect information about a running condition of one's own vehicle. The vehicle state detection sensor 22 is composed of, for example, a vehicle speed sensor to detect a speed of the one's own vehicle, and outputs a detected vehicle speed to the transmission control device 10. The vehicle state detection sensor 22 may include, besides the vehicle speed sensor, a weight sensor to detect a weight of the vehicle, a yaw rate sensor, a steering angle sensor, or the like.

The current position detection sensor 24 detects a current position of the one's own vehicle on the basis of, for example, a GPS measurement signal, and outputs a detected current position to the transmission control device 10. The road data storage means 26 is composed of, for example, a hard disk memory, a flash memory, a DVD-ROM, and a CD-ROM. The road data storage means 26 stores therein road data (road map data), and is capable of outputting the road data to the transmission control device 10. The current position detection sensor 24 and the road data storage means 26 can be composed of, for example, a well-known navigation device. Alternatively, the road data storage means 26 may be composed of a memory included in the transmission control device 10.

As shown in FIG. 1, the transmission control device 10 includes, as a module that achieves a function of automatically performing downshift control in front of a blind corner, an accelerator opening degree measurement means (accelerator opening degree measurement module) 11, a blind corner determination means (blind corner determination module) 12, a blind distance calculation means (blind distance calculation module) 13, a necessary engine braking amount calculation means (necessary engine braking amount calculation module) 14, a required speed change stage determination means (required speed change stage determination module) 15, and a transmission control means (transmission control module) 16. For simplicity, even though FIG. 1 shows only the modules 11 to 16 that achieve the function related to the automatic downshift control in front of the blind corner, the transmission control device 10 also includes modules that achieve a function of performing regular transmission control, namely, performing control to automatically switch speed change stages in response to a vehicle speed and a rotative speed of the engine. As being well known, the transmission control device 10 is also capable of accepting a speed change stage alter instruction through a manual operation by the driver. Means for inputting an upshift instruction or a downshift instruction (not shown) for a speed change stage by the manual operation can include, for example, a shift lever, a paddle switch, an engine brake switch, or a voice recognition means. The foregoing modules that achieve the various kinds of control functions can typically be computer program modules composed of instructions being executable by a processor unit. Besides ones which are composed of a computer program, the foregoing modules may be modules composed of a dedicated electric/electronic hardware device.

The accelerator opening degree measurement means 11 measures an accelerator opening degree of the engine on the basis of a detection signal being input from the accelerator opening degree sensor 20. The accelerator opening degree measurement means 11 needs to be capable of detecting at least whether the accelerator is fully closed or not.

The blind corner determination means 12 detects a corner that appears in a traveling direction of the vehicle, and then determines whether a detected corner is a blind corner or not. The blind corner determination means 12 is capable of detecting a corner that appears in the traveling direction of a traveling vehicle on the basis of, for example, a current position of one's own vehicle being output from the current position detection sensor 24 and road data (road map data) being output from the road data storage means 26. Any conventionally known technology is applicable to the corner detection method.

Figure 2:
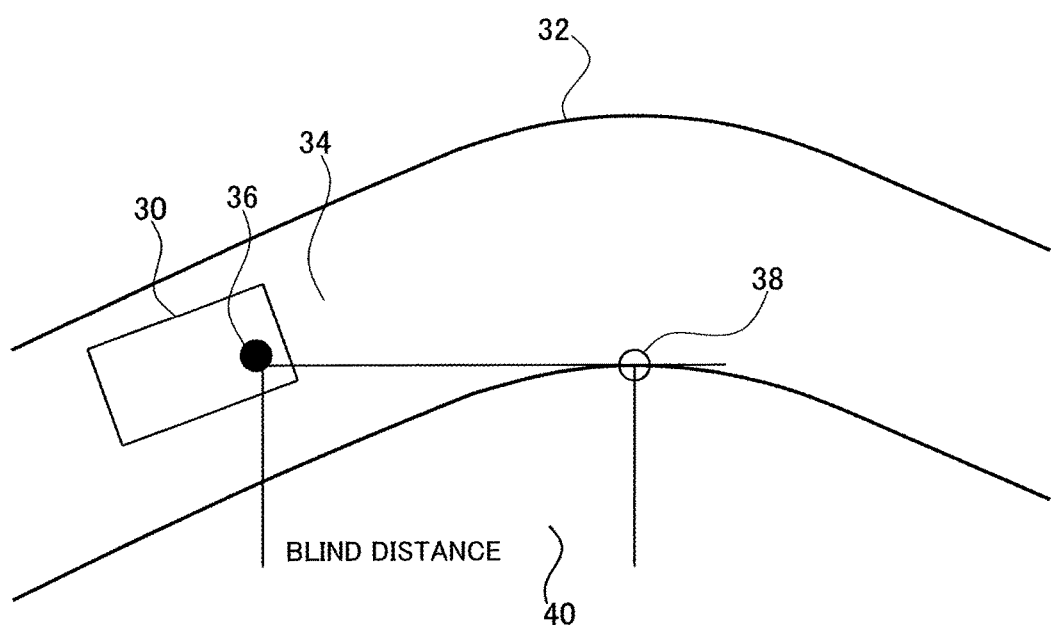
FIG. 2 is a diagram that describes a blind distance.

The blind corner denotes such a corner that a driver of a vehicle is unable to see an end of a corner during a corner determination. FIG. 2 is a diagram that describes the blind corner. In FIG. 2, a vehicle 30 is traveling in an arrowed direction 34. When a corner that appears ahead of the vehicle 30 is viewed from an eye point 36 of the driver, front visibility is blocked at a position of a point 38 (referred to as "a blind point"), and the driver is unable to see the other end of the corner. The blind corner determination means 12 makes a determination that the corner where the driver is unable to see the other end of the corner, is the blind corner.

A determination as to whether a detected corner is a blind corner or not can be made on the basis of, for example, a preliminary determination result. That is, before shipping a vehicle, a determination is preliminarily made as to whether each of corners existing in the road data is a blind corner or not, and information indicating whether each of the corners is a blind corner or not (blind corner information) is stored in the road data stored in the road data storage means 26. In this case, the blind corner preliminary determination can be made by, for example, computer image processing on the basis of road image information obtained by photographing corners. Upon detection of a certain corner in the traveling direction of the vehicle, the blind corner determination means 12 determines as to whether the detected corner is a blind corner or not by referring to the information stored beforehand.

As another example of the blind corner determination method, the blind corner determination means 12 may determine as to whether the detected corner is a blind corner or not from a relationship between a height of the eye point of the driver (a height of an eye line) and a height of the detected corner. In that case, when shipping the vehicle, the road data storage means 26 stores in advance information indicating the height of the corner in association with each of the corners existing in the road data. The height of the corner indicates a height of an obstacle that blocks the driver's visibility of the end of the corner, such as a guardrail, a wall, or a building, each extending along the corner. The blind corner determination means 12 compares the height of the detected corner and the height of the eye point of the driver, and makes a determination that the corner is a blind corner when the height of the corner is higher than the height of the eye point. Because the height of the eye point can be different for each kind of vehicles, a determination as to what corner is a blind corner can depend on the kind of vehicle, or the like. A value of the height of the eye point in each vehicle is preferably stored in advance in the memory of the transmission control device 10 of the vehicle. Alternatively, the driver may optionally designate and alter the value of the height of the eye point.

The blind distance calculation means 13 refers to a distance 40 between a blind corner and one's own vehicle (refer to FIG. 2) as a "blind distance" in the present specification. As shown in FIG. 2, the blind distance 40 corresponds to a distance in a straight line from a vehicle position to a blind point 38. The blind distance calculation means 13 is capable of calculating the blind distance 40 from a current position of the vehicle and a tangent of a curvature of the blind corner relative to the current position. The curvature of the blind corner is calculable with a well-known calculation method on the basis of the road data stored in the road data storage means 26.

The necessary engine braking amount calculation means 14 calculates a necessary engine braking amount on the basis of the calculated blind distance 40. The necessary engine braking amount is the engine braking amount necessary for decelerating a current vehicle speed to a vehicle speed at which a stop at a zero vehicle speed is performable near the blind corner when a braking operation is performed with a braking amount with a full braking performance of the vehicle (referred to as "a full braking amount"). In other words, the necessary engine braking amount is such a braking amount that achieves a target deceleration for decelerating the current vehicle speed to the vehicle speed at which the stop at the zero vehicle speed is attainable around the blind corner by the full braking.

The necessary engine braking amount is calculable from, for example, the following (Equation 1).

Necessary engine braking amount=Necessary braking amount−Full braking amount    (Equation 1)

In the above (Equation 1), "full braking amount" is a predetermined braking force corresponding to the full braking performance of a vehicle, and a value thereof is determined in advance according to a specification of the vehicle, or the like. The full braking amount is configured to be stored in advance, for example, in the memory of the transmission control device 10. Meanwhile "necessary braking amount" is a braking amount necessary for making a complete stop at a zero vehicle speed near the blind corner accordingly to the blind distance 40 and the current vehicle speed. The blind distance 40 is as described above, and is calculable from a vehicle position and the curvature of the blind corner. The current vehicle speed is acquirable from the vehicle state detection sensor 22.

Figure 3:
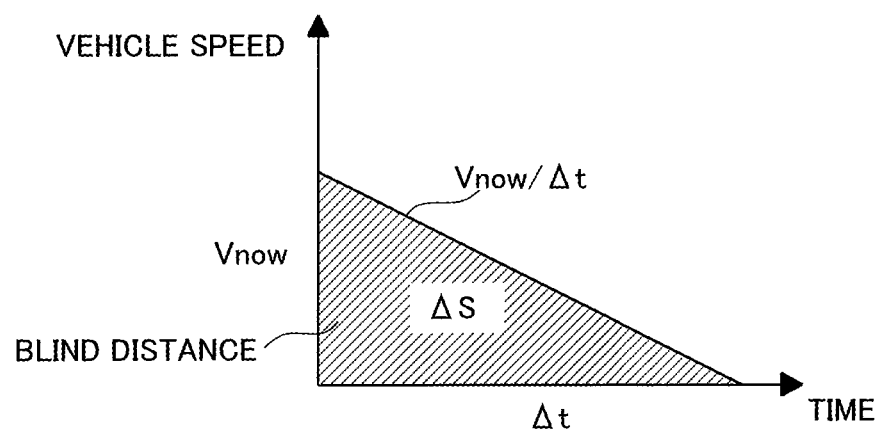
FIG. 3 is a graph that describes a relationship between blind distance, current vehicle speed, and deceleration target time.

An example of a method of calculating the "necessary braking amount" is described below with reference to the graph of FIG. 3. In FIG. 3, an ordinate represents current vehicle speed Vnow and an abscissa represents time $\Delta t$. Here, time required for decelerating the current vehicle speed Vnow to a zero vehicle speed in a certain blind distance $\Delta S$ is referred to as a deceleration target time $\Delta t$. A relationship between the blind distance $\Delta S$, the current vehicle speed Vnow, and the deceleration target time $\Delta t$ can be expressed as shown in the graph of FIG. 3. Therefore, as apparent from FIG. 3, the deceleration target time $\Delta t$ is calculable on the basis of the blind distance $\Delta S$ and the vehicle speed Vnow at the present time (when performing processing for the blind corner determination and the engine braking amount calculation). Then, a deceleration [Vnow/$\Delta t$] for decelerating the current vehicle speed Vnow to the zero vehicle speed in the certain blind distance $\Delta S$ is calculable by dividing the current vehicle speed Vnow by the deceleration target time $\Delta t$.

Accordingly, the necessary braking amount is calculable as a product of a vehicle weight m and the deceleration Vnow/$\Delta t$, namely, a braking force as shown in the following (Equation 2).

Necessary braking amount= Vehicle weight $m*(Vnow/\Delta t)$    (Equation 2)

In Equation 2, "*" indicates multiplication. Vehicle weight m is acquirable from, for example, the vehicle state detection sensor 22.

For example, when the necessary braking amount calculated by (Equation 2) is larger than a predetermined full braking amount, it is difficult to completely stop the vehicle in front of the blind corner even when a braking operation is performed with the full braking amount. However, it becomes possible to decelerate to a vehicle speed at which it is possible to stop near the blind corner by calculating, as a necessary engine braking amount, a difference of the full braking amount from the necessary braking amount by the above-mentioned (Equation 1), and then downshifting to a speed change stage based on the necessary engine braking amount, followed by applying engine braking. If the current vehicle speed is already decelerated to the vehicle speed at which it is possible to stop as described above, for example, it becomes possible to stop by a braking operation before reaching the front of the blind corner even when, for example, any obstacle is found suddenly in front of the blind corner. This makes it possible to avoid sudden danger in front of the blind corner. Therefore, the necessary engine braking amount calculated by the necessary engine braking amount calculation means 14 corresponds to an appropriate engine braking amount that fits the characteristics of the blind corner.

Figure 4:
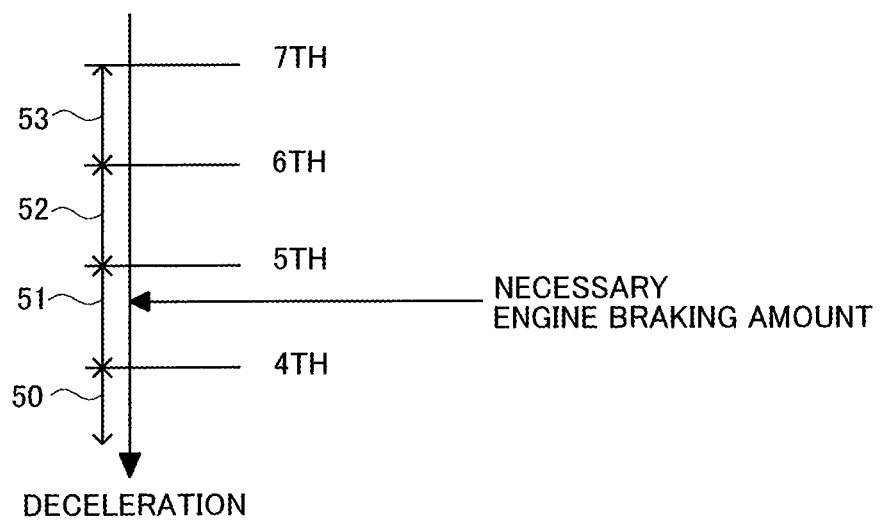
FIG. 4 is a diagram that describes an example of determination rules for a required speed change stage corresponding to a necessary engine braking amount.

The required speed change stage determination means 15 determines a required speed change stage on the basis of the necessary engine braking amount. FIG. 4 is a diagram that describes an example of rules for determining a required speed change stage corresponding to a necessary engine braking amount. In FIG. 4, an ordinate represents engine braking amount (namely, deceleration), and the deceleration increases downward from the top in the drawing. Expected engine braking amount to be expected when selecting one of speed change stages of 7-speed ("7TH"), 6-speed ("6TH"), 5-speed ("5TH"), 4-speed ("4TH") . . . is calculable on the basis of various parameters in a running state from the following (Equation 3). An example of determination rules is to select a speed change stage corresponding to an expected engine braking amount achieving a deceleration that is smaller by one stage relative to a deceleration of a necessary engine braking amount (namely, a speed change stage that achieves a deceleration smaller than the deceleration of the necessary engine braking amount). For example, when the necessary engine braking amount is in a range of 5TH and 4TH indicated by reference numeral 51, the required speed change stage determination means 15 determines, as a required speed change stage, 5TH with lesser deceleration, and also determines, as a required speed change stage, 4TH when the necessary engine braking amount is in a range indicated by reference numeral 50, 6TH when being in a range indicated by reference numeral 52, and 7TH when being in a range indicated by reference numeral 53. Thus, by selecting the speed change stage achieving the deceleration that is smaller by one stage relative to the deceleration of the necessary engine braking amount, it is possible to prevent excessive engine braking by the automatic downshift control.

The expected engine braking amount of each of the speed change stages is calculable, for example, from a sum of the following individual forces: (force 1), (force 2), and (force 3) as shown in (Equation 3).

$$\text{Engine braking amount of speed change stage} = \text{(force 1)} + \text{(force 2)} + \text{(force 3)} \quad \text{(Equation 3)}$$

(Force 1): damping force due to engine friction*ratio for each speed change stage*final ratio
(Force 2): rolling resistance force=$\mu$*W*cos θ
(Force 3): air resistance force=½*ρ*CD*S*(V/36)^2

Here, "*" denotes multiplication symbol, "$\mu$" denotes coefficient of friction, "W" denotes load, "ρ" denotes air density, CD denotes air resistance coefficient, "S" denotes frontal projected area, "V" denotes velocity, and "^2" denotes square symbol.

The transmission control means 16 is configured to select the required speed change stage determined by the required speed change stage determining means 15 as a target speed change stage of the automatic downshift control, and then output a downshift instruction signal intended for the selected target speed change stage to the transmission mechanism, thereby automatically performing transmission control to the selected target speed change stage (namely, downshift control). This makes it possible to apply the engine braking with an optimum engine braking amount corresponding to the characteristics of the blind corner. It is therefore possible to automatically achieve the driver's intention of applying the engine braking with the optimum engine braking amount corresponding to the characteristics of the blind corner. In particular, with the multi-staged automatic transmission 100, it takes much time to obtain the intended engine braking amount by a manual downshift operation on a one stage basis. It is however possible to apply the optimum engine braking without spending much time owing to the configuration adapted to automatically perform downshift to the optimum speed change stage that fits the characteristics of the blind corner.

Figure 5:
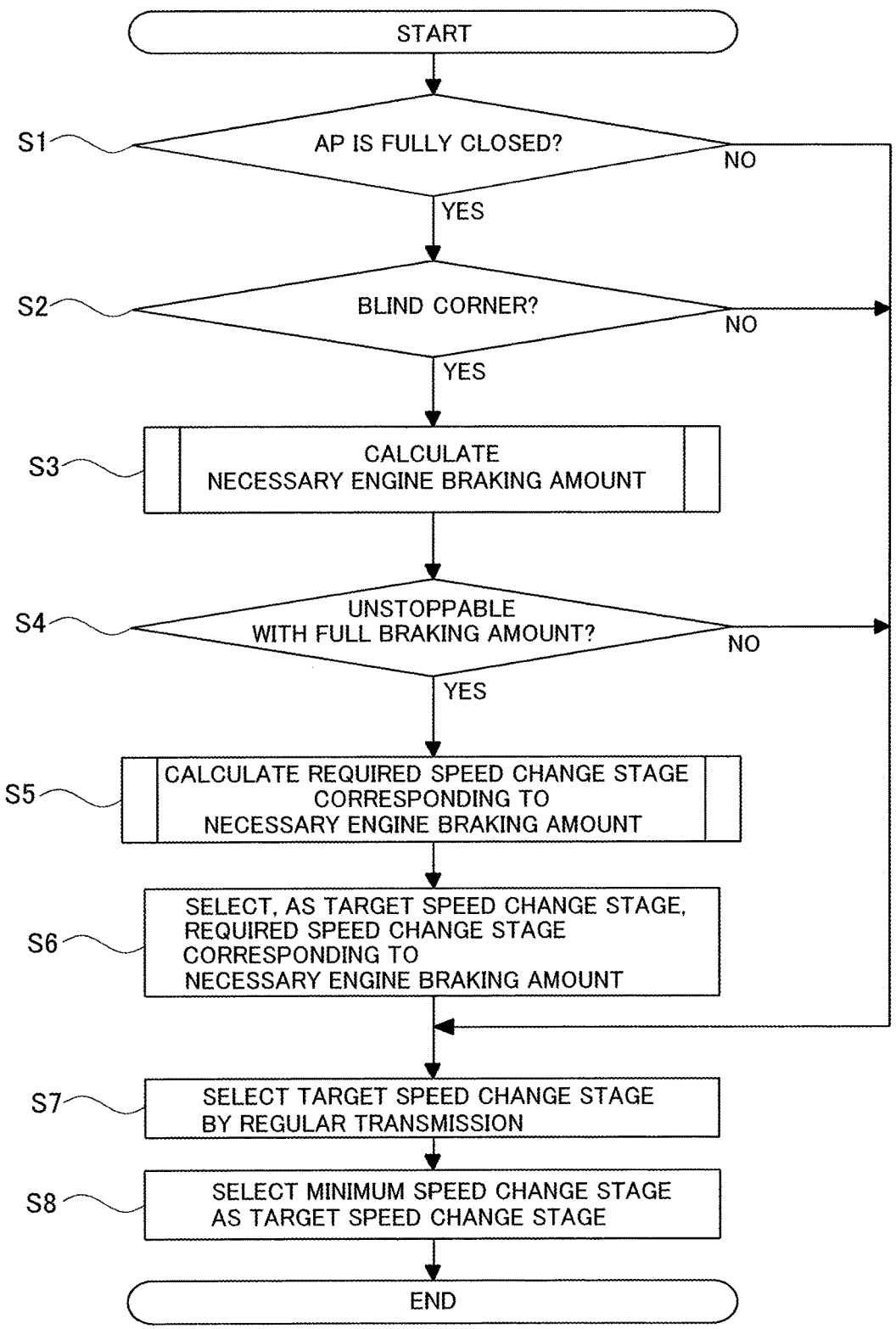
FIG. 5 is a flow chart that shows an example of automatic transmission control processing performed by the transmission control device for the automatic transmission according to the embodiment of the present invention.

FIG. 5 is a flow chart that shows an example of automatic transmission control processing performed by the CPU of the transmission control device 10. For example, upon detection of a corner in the traveling direction of the vehicle, the CPU of the transmission control device 10 starts processing in FIG. 5. In step S1, the CPU of the transmission control device 10 determines whether an accelerator opening degree of the engine measured by the accelerator opening degree measurement means 11 ("AP" in the drawing) is a fully closed state or not. When the accelerator opening degree is not fully closed (NO in step S1), the CPU of the transmission control device 10 advances processing to step S7 without performing the automatic downshift control in step S2 and subsequent steps.

When the accelerator opening degree is fully closed (YES in step S1), the CPU of the transmission control device 10 determines in step S2 as to whether the corner detected in the traveling direction of the vehicle is a blind corner or not (the operation of the blind corner determination means 12). When the corner detected in the traveling direction of the vehicle is a blind corner (YES in step S2), in step S3, the CPU of the transmission control device 10 calculates a blind distance 40 and calculates a necessary engine braking amount on the basis of the calculated blind distance 40, or the like (the operations of the blind distance calculation means 13 and the necessary engine braking amount calculation means 14).

In step S4, the CPU of the transmission control device 10 determines whether it is possible to completely stop the vehicle near the determined blind corner when the braking operation is performed with a full braking amount. This determination is made on, for example, whether or not the necessary braking amount is larger than the full braking amount. When the necessary braking amount is larger than the full braking amount, a complete stop is not achievable. If it is not possible to completely stop the vehicle in front of the corner (YES in step S4), the CPU of the transmission control device 10 advances processing to steps S5 and S6 described later. When the necessary braking amount is the full braking amount or less and the complete stop is achievable (NO in step S4), the CPU of the transmission control device 10 skips steps S5 and S6, and advances processing to step S7.

In step S5, the CPU of the transmission control device 10 determines a required speed change stage corresponding to the calculated necessary engine braking amount (the operation of the required speed change stage determination means 15), and in step S6, selects a determined required speed change stage as a target speed change stage of the automatic downshift control (the operation of the transmission control means 16).

Separately from the automatic downshift control when entering the blind corner in the steps S3 to S6, the CPU of the transmission control device 10 accepts, in step S7, selection of a target speed change stage by a regular automatic or manual transmission control. Then, in step S8, the CPU of the transmission control device 10 selects, as a target speed change stage, a lower speed change stage from the target speed change stage (required speed change stage) selected in the step S6 and the target speed change stage selected in the step S7, and then outputs a downshift instruction signal intended for a selected target speed change stage to the transmission mechanism (the operation of the transmission control means 16). For example, while traveling along a downhill, a speed change stage of a low ratio can be selected as a target speed change stage by the regular automatic transmission control. The driver may manually select the speed change stage of the low ratio as a target speed change stage. By selecting a minimum speed change stage in the step S8, it becomes possible to perform transmission control taking into consideration speed change factors other than the characteristics of the corner, and the driver's intention, instead of usually, surely performing the downshift control based on the characteristics of the blind corner.

In the example of FIG. 5, when the accelerator opening degree is not in a full close, it proceeds from NO in step S1 to step S7 after skipping the steps S3 to S6, so as not to perform the processing for applying engine braking. The reason for this is to respect the driver's intention through accelerator pedal depression (not being the full close in accelerator opening degree). Although the processing of the step Si (the processing of determining whether the accelerator opening degree is fully closed or not) is carried out efficiently if performed at the first stage of the flow in FIG. 5, this processing may be performed at any stage of steps S2 to S6, instead of the first stage. Alternatively, step Si may be deleted, and the processing in the steps S3 to S6 may be performed even when the accelerator opening degree is not fully disclosed.

Figure 6:
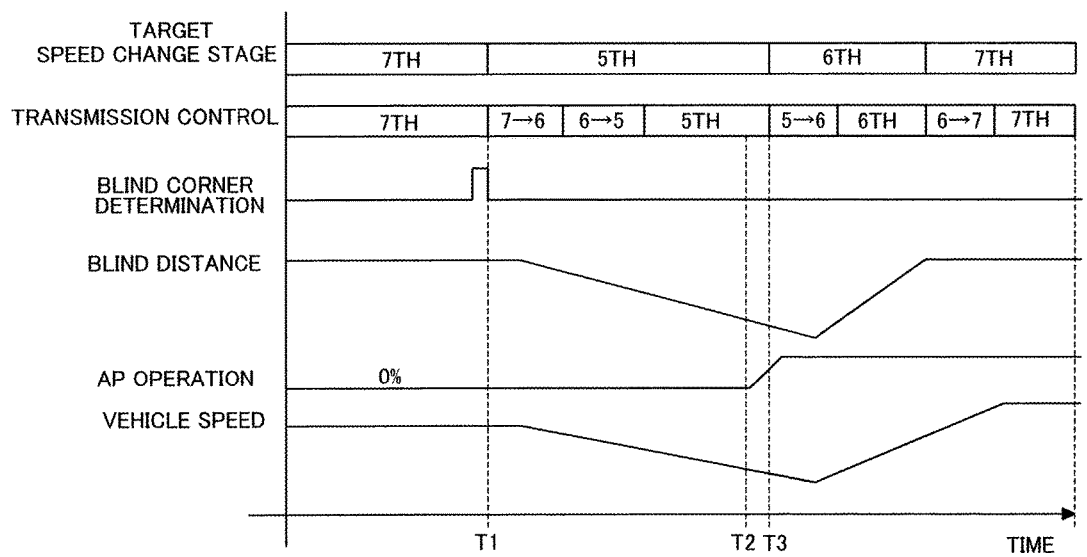
FIG. 6 is a time chart that describes an example of a downshift operation during passage through a blind corner.

FIG. 6 is a time chart that describes an operation when performing the automatic downshift control from 7-speed to 5-speed in front of a blind corner. Assume in FIG. 6 that 7-speed (7TH) is already selected as a target speed change stage of the automatic transmission control before a blind corner determination point T1, and the transmission control device 10 has selected 7-speed (7TH) as a target speed change stage of the automatic transmission control. Also assume that the accelerator opening degree (AP operation) is in the fully closed state with an opening degree of 0%.

When a blind corner in front of a vehicle is detected at T1 (YES in the step S2), the CPU of the transmission control device 10 calculates a necessary engine braking amount corresponding to a blind distance and a current speed, and sets, as a target speed change stage, 5-speed (5TH) determined on the basis of a calculated necessary engine braking amount (the steps S3 to S6). In response to this, the transmission control device 10 performs downshift control from the current speed change stage 7TH to the target speed change stage 5TH. FIG. 6 shows an example of downshift control. That is, downshift control is sequentially performed on a one stage basis in the following transmission control procedure that firstly from 7TH to 6TH ("7→6" in the drawing), then from 6TH to 5TH ("6→5" in the drawing), and thereafter from 6TH to 5TH is performed ("5TH" in the drawing). Although a blind distance (a distance from a current position to a blind corner) decreases as the vehicle travels forward, a current vehicle speed can be appropriately decelerated before entering the corner because engine braking is applied by the automatic downshift control. It is therefore possible to, for example, effectively stabilize the vehicle behavior while passing through the corner, and immediately generate a driving force at a rising of the corner. Additionally, because it is configured to automatically perform downshift, an engine braking amount that fits the characteristics of the blind corner is rapidly obtainable in less time than the case of manually instructing downshift on a one stage basis.

The driver increases an accelerator opening degree by performing an accelerator pedal operation before the vehicle finally passes through the blind corner ("T2" in the drawing). In response to the accelerator operation, the transmission control device 10 selects 6-speed ("6TH" in the drawing) as a target speed change stage by the regular transmission control, and performs upshift control from 5TH to 6TH ("T3" in the drawing). After passing through the corner, as the vehicle speed increases, the transmission control device 10 selects 7TH as a target speed change stage, and performs upshift control from 6TH to 7TH. Thus, a stable travel is achievable by appropriately decelerating in front of the corner, thereby achieving a smooth acceleration after it is possible to see the other end of the corner.

In FIG. 6, when performing the transmission control from 7TH to 5TH, the downshift is sequentially performed in the following manner: firstly, from 7TH to 6TH, and then from 6TH to 5TH. Without being limited thereto, a direct downshift from the current speed change stage (7TH) to the target speed change stage (5TH) may be performed.

While the embodiments of the present invention have been described above, the present invention is not limited to the above embodiments, and various modifications may be made within the scope of the technical ideas described in the claims, specification, and drawings. For example, the method of determining a blind corner is not limited to the above method. The method of calculating a necessary engine braking amount is not limited to the above method. Alternatively, it may be configured so that when traveling a blind corner, a target speed change stage selected in step S6 is surely selected without performing steps S7 and S8 in FIG. 5. Still alternatively, the automatic transmission 100 may be one which has any mechanism.

The invention claimed is:

1. A transmission control device for an automatic transmission, comprising:
    a current position detector that is configured to detect a current position of a vehicle;
    a storage device configured to store road data;
    a corner determinator that is configured to detect a corner appearing in a traveling direction of the vehicle and determine whether a detected corner is a blind corner in which an end of the corner is not visible from the vehicle, based upon the detected current position and the stored road data;

a blind distance calculator that is configured to calculate, when a determination is made that the corner is a blind corner, a distance from the determined blind corner to the vehicle based upon the detected current position and the stored road data;

a necessary engine braking amount calculator that is configured to calculate, based upon the calculated distance, a necessary engine braking amount necessary for decelerating a current vehicle speed to a vehicle speed at which it is possible to stop around the blind corner when a braking operation is performed with a full braking amount;

a required speed change stage determinator that is configured to determine a required speed change stage on a basis of the calculated necessary engine braking amount; and a transmission controller that is configured to perform transmission control so as to achieve a downshift to the determined required speed change stage.

2. The transmission control device for the automatic transmission according to claim 1, wherein, when a determination is made that the corner is the blind corner, and when an accelerator opening degree is a fully closed state, the blind distance calculator calculates a distance from the determined blind corner to the vehicle on the basis of the detected current position and the stored road data.

3. The transmission control device for the automatic transmission according to claim 1, wherein the corner determinator determines whether a corner appearing in the traveling direction of the vehicle is the blind corner on a basis of blind corner information contained in the road data.

4. The transmission control device for the automatic transmission according to claim 1, wherein the corner determinator determines whether a corner appearing in the traveling direction of the vehicle is the blind corner based upon information indicating a height of the blind corner contained in the road data and a height of an eye line of a driver.

5. The transmission control device for the automatic transmission according to claim 1, wherein the required speed change stage determinator determines, as the required speed change stage, a speed change stage to achieve a deceleration smaller than a deceleration of the necessary engine braking amount.

6. A non-transitory computer readable medium having stored thereon processor-executable instructions configured to perform a method comprising the steps of:

detecting a corner appearing in a traveling direction of a vehicle and determining whether a detected corner is a blind corner where an end of the corner is not visible from the vehicle, on a basis of a current position of the vehicle and road data;

calculating, when a determination is made that the corner is a blind corner, a distance from the determined blind corner to the vehicle on a basis of the current position of the vehicle and the road data;

calculating, on a basis of the calculated distance, a necessary engine braking amount necessary for decelerating a current vehicle speed to a vehicle speed at which it is possible to stop around the blind corner when a braking operation is performed with a full braking amount;

determining a required speed change stage on a basis of the calculated necessary engine braking amount; and performing control so as to achieve a downshift to the determined required speed change stage.

7. The transmission control device for the automatic transmission according to claim 2, wherein the corner determinator determines whether a corner appearing in the traveling direction of the vehicle is the blind corner on a basis of blind corner information contained in the road data.

8. The transmission control device for the automatic transmission according to claim 2, wherein the corner determinator determines whether a corner appearing in the traveling direction of the vehicle is the blind corner based upon information indicating a height of the blind corner contained in the road data and a height of an eye line of a driver.

9. The transmission control device for the automatic transmission according to claim 3, wherein the corner determinator determines whether a corner appearing in the traveling direction of the vehicle is the blind corner based upon information indicating a height of the blind corner contained in the road data and a height of an eye line of a driver.

10. The transmission control device for the automatic transmission according to claim 7, wherein the corner determinator determines whether a corner appearing in the traveling direction of the vehicle is the blind corner based upon information indicating a height of the blind corner contained in the road data and a height of an eye line of a driver.

11. The transmission control device for the automatic transmission according to claim 2, wherein the required speed change stage determinator determines, as the required speed change stage, a speed change stage to achieve a deceleration smaller than a deceleration of the necessary engine braking amount.

12. The transmission control device for the automatic transmission according to claim 3, wherein the required speed change stage determinator determines, as the required speed change stage, a speed change stage to achieve a deceleration smaller than a deceleration of the necessary engine braking amount.

13. The transmission control device for the automatic transmission according to claim 4, wherein the required speed change stage determinator determines, as the required speed change stage, a speed change stage to achieve a deceleration smaller than a deceleration of the necessary engine braking amount.

14. The transmission control device for the automatic transmission according to claim 7, wherein the required speed change stage determinator determines, as the required speed change stage, a speed change stage to achieve a deceleration smaller than a deceleration of the necessary engine braking amount.

15. The transmission control device for the automatic transmission according to claim 10, wherein the required speed change stage determinator determines, as the required speed change stage, a speed change stage to achieve a deceleration smaller than a deceleration of the necessary engine braking amount.

* * * * *